Nov. 2, 1926.

W. H. GILTNER

GENERATOR

Filed March 17, 1925

1,605,182

WITNESSES
Chr. Nielsen
W. F. Buckley

INVENTOR
W. H. Giltner,
BY Munn & Co.
ATTORNEYS

Patented Nov. 2, 1926.

1,605,182

UNITED STATES PATENT OFFICE.

WILLIAM HILTON GILTNER, OF LEXINGTON, KENTUCKY.

GENERATOR.

Application filed March 17, 1925. Serial No. 16,248.

This invention relates to a device for introducing steam or water vapor along with the air and hydrocarbon into the cylinders of an internal combustion engine to further the complete combustion of the charge, minimize the accumulation of carbon in the engine, and increase the power and efficiency of the engine.

The object of the present invention is to provide a device of this character which has no springs, moving parts or valves (with the exception of one small cut off valve) to get out of adjustment; which has no small pipes to get clogged; which is of simple and durable construction and susceptible of manufacture at a comparatively slight cost from materials and by means of facilities ordinarily available; which requires no attention from the operator except the replenishment of the supply of water and even though the supply of water should be exhausted liability of damage is avoided and the operation of the engine still enhanced to some extent; and which can be easily installed on practically any standard type of automobile engine with the expenditure of but little time and labor.

Figure 1:
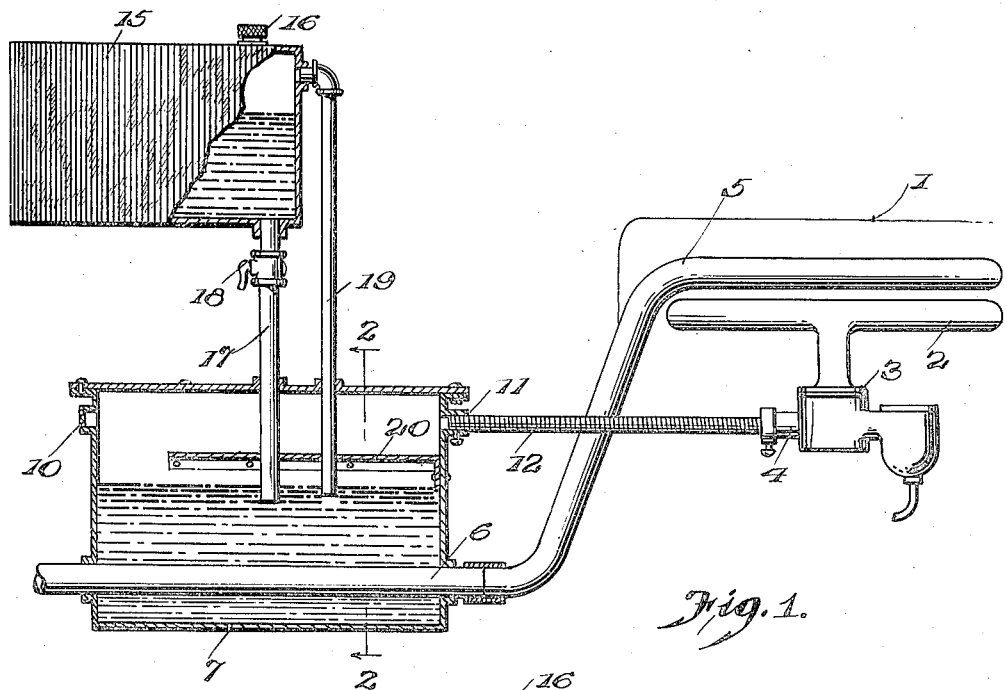
Figure 2:
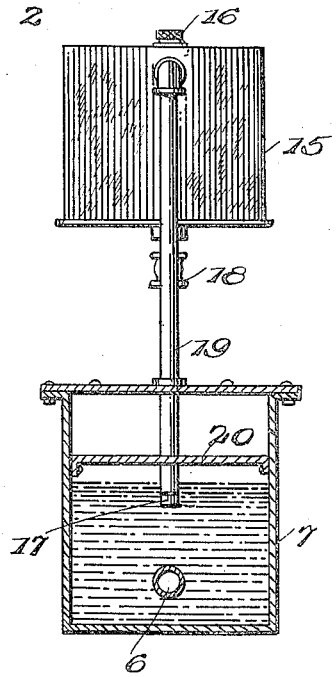

Other objects and advantages reside in certain novel features of the construction, arrangement and combination of parts which will be hereinafter more fully described and particularly pointed out in the appended claims, reference being had to the accompanying drawings forming a part of this specification, and in which, Figure 1 is a view partly in longitudinal vertical section and partly in elevation showing the device applied to the engine of an automobile, and Figure 2 is a view in transverse section on line 2—2 of Figure 1.

Referring to the drawings the numeral 1 designates generally an internal combustion engine of the type ordinarily employed on automobiles or similar motor vehicles. The engine has the usual intake manifold 2 supplied with fuel from a carburetor 3, the carburetor 3 having an air intake 4. An exhaust manifold 5 is also provided and has an exhaust pipe 6 leading therefrom.

The present invention proposes the provision of a steam or water vapor generating tank 7 through the lower part of which the exhaust pipe 6 extends. The walls of the tank through which the pipe 6 passes have suitable openings accommodating the same and the exhaust pipe is suitably connected to the walls of these openings or suitable packing is provided to form leak tight connections.

The tank 7 is formed in the upper part of one end with an air inlet 10 and in the upper part of its opposite end an outlet 11 is provided. A flexible pipe 12 leads from the outlet 11 to the intake 4 of the carburetor. The flexible pipe or tubing 12 is preferably of the same size as the air intake 4.

A water supply tank or reservoir 15 is provided and is located above the tank 7. The tank 15 is air tight and has a removable filling cap or plug 16 which also may be screwed up air tight. A water supply pipe 17 leads from the bottom of the tank 15 and communicates with tank 7 at a point just below the desired water level in the tank. A shut off valve 18 is incorporated in the pipe 17 and is used when filling the tank 15. An air vent pipe 19 leads from the top of the tank 15 to the tank 7 and communicates with the tank at the point where it is desired to have the water level in the tank 7. With this arrangement when the water level falls in the tank 7 to uncover the lower end of the pipe 19 air is admitted above the water in the tank 15 and water flows from the tank 15 to the tank 7 until the proper water level is restored in the tank 7 at which time the lower end of the pipe 19 is submerged to shut off the flow of air through the pipe 19 and consequently stop the flow of water through pipe 17. This is believed to be a better and simpler mode of maintaining a proper level of water in the tank 7 than the use of a float controlled valve or a needle valve drip system.

A baffle 20 which may be a screen or a perforated plate is provided above the water level to prevent undesirable splashing and movement of the water.

In operation when the engine is started the exhaust gases heat up the pipe 6 and consequently heat up the water in the tank 7 to produce steam or water vapor. The air supply at all times is drawn in through the inlet 10, tank 7 and pipe 12 to the intake 4 of the carburetor 3 and when the steam or water vapor is formed it is entrained in and comingled with the air prior to the entrance of the air into the carburetor and prior to the co-mingling of the air with the hydrocarbon. The air is of course heated prior to its inflow into the carburetor. The mixing of the steam or heated water vapor with the air and the supplying of the resulting mixture to the air intake of the carburetor is believed to be an important feature of the invention and is believed to enhance the operation. The maintenance of the proper water level in the manner described is also believed to be a desirable and important feature. If the water supply should be exhausted and not replenished the air would be preheated, a feature aiding carburation, and there would be no danger of injury or damage. The only attention required by the operator is the replenishment of the water supply and there are no parts requiring adjustment and no small pipes or passages liable to become clogged.

I claim:

1. In combination with an internal combustion engine having a carbureter provided with an air intake, a generating tank, means for supplying water to the tank, means for maintaining the water at a definite level in and below and spaced from the top of the tank, there being a large and open vapor space between the surface of the water and the top of the tank in direct communication with the water, a direct immediate and unobstructed air inlet leading horizontally and laterally into the tank at one side thereof at a point above the water level and directly into the vapor space, an outlet leading from the tank at a point opposite the air inlet and also above the water level and in direct communication with the vapor space so that the air sweeps across the entire extent of the tank and vapor space above the water level in passing from the inlet to the outlet, a direct connection between the outlet and the carbureter air intake, a baffle extending entirely across and lengthwise of the tank from the outlet end to a point adjacent to but spaced from the inlet end thereof and means for heating the water in the tank.

2. In combination with an internal combustion engine having a carbureter provided with an air intake, a generating tank, means for supplying water to the generating tank including an air tight reservoir located above the level of the tank, a water pipe leading from the bottom of the reservoir to the tank and an air pipe leading from the reservoir to the tank and communicating with the tank at the water level, an air inlet to the tank, an outlet from the tank, a connection between the outlet and the carbureter air intake, and means for heating the water in the tank.

WILLIAM HILTON GILTNER.